United States Patent
Mareuge et al.

(10) Patent No.: US 12,510,453 B2
(45) Date of Patent: Dec. 30, 2025

(54) METHOD FOR DETERMINING, IN REAL-TIME AND CONTINUOUSLY, AN AMOUNT OF PARTICLES OF A GIVEN MATERIAL

(71) Applicants: UBY, Paris (FR); ELLONA, Toulouse (FR)

(72) Inventors: Laurent Mareuge, Marly le Roi (FR); Ivan Romanytsia, Toulouse (FR)

(73) Assignees: UBY, Paris (FR); ELLONA, Toulouse (FR)

( * ) Notice: Subject to any disclaimer, the term of this patent is extended or adjusted under 35 U.S.C. 154(b) by 148 days.

(21) Appl. No.: 18/274,041

(22) PCT Filed: Jan. 26, 2022

(86) PCT No.: PCT/FR2022/050138
§ 371 (c)(1),
(2) Date: Jul. 25, 2023

(87) PCT Pub. No.: WO2022/162307
PCT Pub. Date: Aug. 4, 2022

(65) Prior Publication Data
US 2024/0410807 A1    Dec. 12, 2024

(30) Foreign Application Priority Data
Jan. 29, 2021    (FR) ..................................... 2100900

(51) Int. Cl.
*G01N 15/075*    (2024.01)
*G01N 21/94*    (2006.01)
(Continued)

(52) U.S. Cl.
CPC ........... *G01N 15/075* (2024.01); *G01N 21/94* (2013.01); *G01N 35/00722* (2013.01);
(Continued)

(58) Field of Classification Search
CPC ................. G01N 15/075; G01N 21/94; G01N 35/00722; G01N 2015/0046;
(Continued)

(56) References Cited

U.S. PATENT DOCUMENTS

2015/0068806 A1 *  3/2015  Duran Toro ............ E21B 49/02
                                                        175/50
2016/0041074 A1    2/2016  Pliskin

FOREIGN PATENT DOCUMENTS

CN          104 198 342 B      5/2017
WO      WO 2019/232450 A1    12/2019

OTHER PUBLICATIONS

PCT International Search Report and Written Opinion for PCT/FR2022/050138 (May 19, 2022).
INPI Search Report for FR2100900 (Sep. 30, 2021).

* cited by examiner

*Primary Examiner* — Tony Ko
(74) *Attorney, Agent, or Firm* — Harness, Dickey & Pierce, P.L.C.

(57) ABSTRACT

This disclosure describes a method for determining, in real time and continuously, an amount of particles of a given material in a sample, including steps of: E1: optically measuring a signature of the sample by an optical sensor; E2: identifying, by a processing unit, the type of the sample by a classification model trained on a training database including a plurality of reference signatures, each reference signature being associated with a reference sample type; and E3: determining, by the processing unit, the amount of particles of the given material in the sample based on the identified sample type and a correspondence table associating, with each of a plurality of reference sample types, a reference amount of particles of the given material.

15 Claims, 3 Drawing Sheets

(51) Int. Cl.
*G01N 35/00* (2006.01)
*G01N 15/00* (2006.01)
(52) U.S. Cl.
CPC ............... *G01N 2015/0046* (2013.01); *G01N 2035/009* (2013.01); *G01N 2201/0221* (2013.01)
(58) Field of Classification Search
CPC ..... G01N 2035/009; G01N 2201/0221; G01N 15/06; G01N 15/0205
See application file for complete search history.

METHOD FOR DETERMINING, IN REAL-TIME AND CONTINUOUSLY, AN AMOUNT OF PARTICLES OF A GIVEN MATERIAL

FIELD OF THE INVENTION

The present invention belongs to the field of air quality monitoring, and relates to a method for determining, in real time and continuously, the amount of particles of a given material in a sample, and a system for determining, in real time and continuously, an amount of particles of a given material in a sample. The present invention can more particularly be used to determine in real time and continuously the amount of respirable crystalline silica emitted by a site operation.

STATE OF THE ART

Air quality is impacted by the type and number of airborne particles. Air quality can affect the health of people breathing that air, in particular when certain potentially harmful particles are present in the air.

In particular, on construction sites, the quality of the air is likely to be deteriorated due to the emission of dust containing particles of certain materials, which can be dangerous for the operators when they breathe them for a prolonged period of time. For example, respirable crystalline silica dust, ballast dust, Lime, other hydraulic binders, polluted earth dust, chromium VI particles, or diesel particles, are likely to be emitted by various construction operations.

Certain types of particles, such as respirable crystalline silica, pose a particularly high health risk, with adverse health effects. Crystalline silica is qualified as respirable when the inhaled particles have a diameter of less than 10 μm, which enables them to reach the pulmonary alveoli and cause pathologies such as silicosis or cancer. Work involving exposure to respirable crystalline silica dust is classified as a carcinogenic activity as of Jan. 1, 2021.

It is therefore important to monitor air quality, that is to say to identify and determine the amount of particles of a given material, in order implement protective measures for operators working on sites that are adapted according to the type and quantity of particles emitted.

Current methods for monitoring air quality consist of taking spot samples on a construction site. These samples are then tested in the laboratory, their chemical analysis allowing to determine the amount of particles of the given materials, for example respirable crystalline silica, in the sample.

The sampling and analysis of samples is a complex and long process, of the order of at least one working day. A device is thus worn all day by an operator, accumulating particles during the day, and is then analyzed the next day in a laboratory.

Consequently, these current methods do not allow to assess the risk, either continuously or in real time or for all the operations carried out on the sites, for operators present on the sites. The operator's protection and alert measures cannot therefore be adapted according to the actual amount of particles in real time and continuously. As a result, the operator may be subjected to amounts of particles of materials potentially dangerous to health, such as respirable crystalline silica, ballast dust, etc., for a relatively long period of time corresponding to the period of time between two samplings. The management of the health risk related to the exposure of operators to particles of certain types of materials is therefore unsatisfactory.

DISCLOSURE OF THE INVENTION

A purpose of the invention is to propose a method for determining an amount of particles of a given material in a sample which is more efficient than the current methods, in particular which allows a real-time and continuous determination of the amount of particles of the given material in an air sample.

For this purpose, the invention describes a method for determining, in real time and continuously, an amount of particles of a given material in a sample, comprising steps of:

E1: optically measuring a signature of the sample;
E2: identifying, by means of a processing unit, the type of the sample by means of a classification model trained on a training database comprising a plurality of reference signatures, each reference signature being associated with a reference sample type; and
E3: determining, by means of the processing unit, the amount of particles of the given material in the sample based on the identified sample type and a correspondence table associating, with each of a plurality of reference sample types, a reference amount of particles of the given material.

Certain preferred but non-limiting features of the method for determining an amount of particles of a given material described above are the following, taken individually or in combination:

the identification of the type of the sample during step E2 comprises a comparison of the signature of the sample with the plurality of reference signatures stored in the training database, and the classification model is a k-nearest neighbor type model;
the classification model is a model of the neural network, support vector machine, stochastic gradient algorithm, or random forest algorithm type;
the given material is at least one of respirable crystalline silica, ballast dust, Lime, diesel particles, polluted earth dust, other hydraulic binders, Chromium VI particles, and/or other particles emitted by various site operations;
the signature of the sample measured in step E1 depends on a size and a number of particles present in the sample;
the signature of the sample measured in step E1 comprises a histogram of distribution of a number of particles in the sample according to the size of the particles;
the sample type identified in step E2 is defined by a nature of the sample and an activity of producing the sample;
the signature of the sample is measured periodically in step E1 at each measurement period, the type of the sample is periodically identified in step E2 at each calculation period and the amount of particles is determined periodically in step E3 at each calculation period;
the calculation period is equal to or greater than the measurement period, the measurement period and the calculation period are comprised between 1 second and 1 hour;
the method further comprises a step E4 of determining, by means of the processing unit an exposure to particles of the given material from the amount of particles of the given material determined in step E2 and of a time of exposure to said particles of the given material;

the method further comprises a step E5 of alerting a user when the exposure to the particles of the given material exceeds a predetermined exposure threshold.

According to a second aspect, the invention also describes a system for determining, in real time and continuously, an amount of particles of a given material in a sample, comprising:
- an optical sensor adapted for measuring a signature of a sample; and
- a processing unit configured to:
  - identify a type of the sample by means of a classification model trained on a training database comprising a plurality of reference signatures, each reference signature being associated with a reference sample type, and
  - determine the amount of particles of the given material in the sample, based on the identified sample type and a correspondence table associating, with each of a plurality of reference sample types, a reference amount of particles of the given material.

The optical sensor can be configured to perform a particle count.

The optical sensor may be portable.

The system for determining, in real time and continuously, an amount of particles of a given material in a sample described above can also comprise storage means configured to store the measurements made by the optical sensor and/or the training database and/or the correspondence table.

DESCRIPTION OF FIGURES

Other features, purposes and advantages of the present invention will appear upon reading the detailed description which follows, given by way of non-limiting example, which will be illustrated by the following figures.

DETAILED DESCRIPTION OF THE INVENTION

Figure 1:
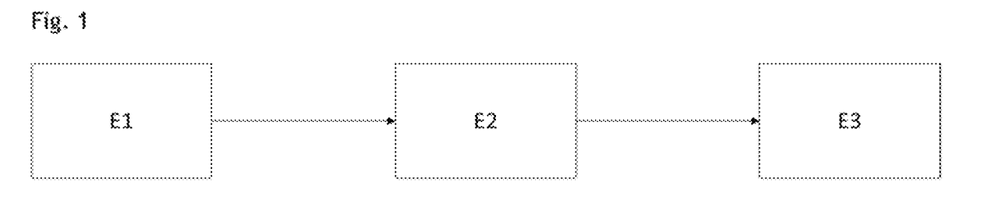
FIG. 1 is a block diagram representing different steps of a method for determining an amount of particles according to one embodiment of the invention.
Figure 2:
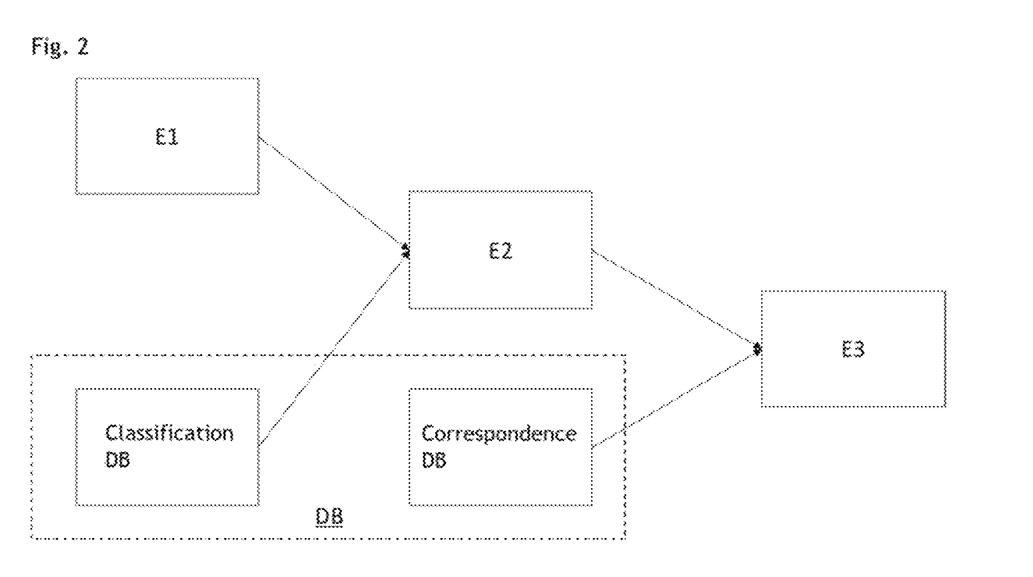
FIG. 2 is a block diagram representing different steps of a method for determining an amount of particles according to one embodiment of the invention.
Figure 3:
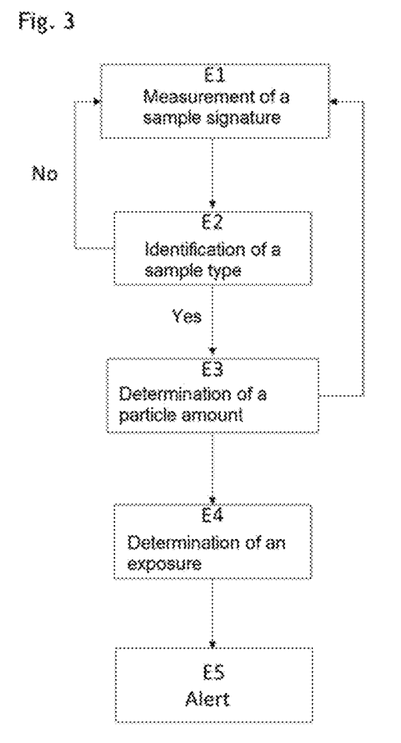
FIG. 3 is a block diagram representing different steps of a method for determining an amount of particles according to one embodiment of the invention.

A method for determining, in real time and continuously, an amount of particles of a given material in a sample, as illustrated byway of non-limiting example in FIG. 1, FIG. 2 and FIG. 3, comprises steps of:
- E1: optically measuring a signature of the sample;
- E2: identifying, by means of a processing unit 20, the type of the sample by means of a classification model trained on a training database comprising a plurality of reference signatures, each reference signature being associated with a reference sample type; and
- E3: determining, by means of the processing unit 20 the amount of particles of the given material in the sample based on the identified sample type and a correspondence table associating, with each of a plurality of reference sample types, a reference amount of particles of the given material.

The method allows to determine an amount of particles of a given material present in a sample, that is to say to differentiate, within the particles present in the sample, the particles of the given material with respect to the particles of other materials.

By "sample", it will be understood that it is a sample of air likely to comprise airborne particles, for example particles of dust or of given materials, and which can in particular be breathed by an individual working on a building site.

Of course, several particle amounts of several different given materials can be determined in step E3. Thus, the particles of one or more materials potentially harmful to health can be distinguished from the particles of other materials that do not have a health hazard.

The method can be implemented for example on construction sites, to improve the management of the health risk of individuals working on construction sites, such as operators or inspectors.

The method allows to determine the amount of particles of the given material in the sample in real time and continuously. By "in real time", it will be understood that said determination is carried out simultaneously with the exposure of the individual to the particles of the given material, for example during the work of the operator or the inspector on the site. By "continuously", it will be understood that said determination is carried out regularly over time, that is to say periodically, and at a period allowing the rapid adaptation of protective measures according to the amount of particles of the given material determined, therefore of the exposure of the individual to the particles of the given material. For example, the determination of the amount of particles can be carried out during an entire working day of the individual, at a calculation period comprised between 1 second and 1 hour.

Thus, the risk resulting from the exposure of the individual to the particles of the given material can be assessed in real time and continuously. The measures for protecting and alerting the individual can therefore be adapted in real time and continuously, which allows to prevent the individual from being too exposed to materials potentially harmful to his health. The management of the health risk related to the exposure of individuals to the particles of certain materials is therefore improved.

The determination of the type of the sample is carried out by means of a classification model. This allows to identify the type of the sample with good reliability, due to the training of the classification model on the training database.

In addition, the allocation of a type to the sample can be carried out including in complex cases where the sample does not correspond to a reference sample type, but to a combination of several reference sample types, for example in the case of dust mixtures.

The classification model thus allows to isolate the different types of dust detected. Thus, depending on the signature of the sample measured in step E1, the identification of the type of the sample carried out in step E2 leads to the allocation to the sample of a type of sample which can either correspond to one reference type or correspond to a combination of multiple reference types.

The given material may be respirable crystalline silica. Thus, the method allows to determine, in real time and continuously, the amount of respirable crystalline silica emitted by site operations. Alternatively or additionally, the given material can be ballast dust, Lime, other hydraulic binders, polluted earth dust or other types of dust, chromium VI particles, or diesel particles, and/or other particles emitted by various site operations.

Step E1: Optical Measurement of a Signature of the Sample

The optical measurement of the signature of the sample is carried out in step E1 in real time and continuously. Thus, the measurement data reflect the quality of the air actually breathed by the individual, in particular by the operator during his work on the site, and the evolution of this air quality over time.

The signature of the sample can be measured periodically in step E1 at each measurement period. Said measurement period can be comprised between 0.1 second and 10 hours, for example comprised between 1 second and 1 hour, for example comprised between 1 minute and 30 minutes, for example be equal to 15 minutes. In the latter case, the signature of the sample is measured every 15 minutes.

The measurement of the signature of the sample can be carried out by means of an optical sensor 10, in particular an optical counter configured to carry out a particle count.

The signature of the sample measured in step E1 can depend on a size and a number of the particles present in the sample. The signature of the sample then depends on the size and the number of the particles present in the sample.

The signature of the sample measured in step E1 can comprise a histogram of distribution of a number of particles in the sample according to the size of the particles, that is to say a histogram of distribution in size of a respirable fraction of particles of the sample.

A concentration of the particles of the given material in the sample, expressed for example in ppm or in $\mu g/m^3$, can be deduced from the histogram of distribution of the number of particles according to their size. For example, the concentration can be determined by assuming that all particles are spherical in shape, and by considering known material density values.

The signature of the sample, in particular the histogram of distribution of the number of particles in the sample according to their size, can be measured in a range of particle sizes which corresponds to particles of size less than 40 μm, for example of size comprised between 0.1 and 10 μm.

The size range can be divided into several slices, the number of particles being measured in each size slice. Each slice can correspond to a size interval of approximately 1 μm. The size range can be divided into a number of slices comprised between 2 and 40, for example into 24 slices.

Figure 4:
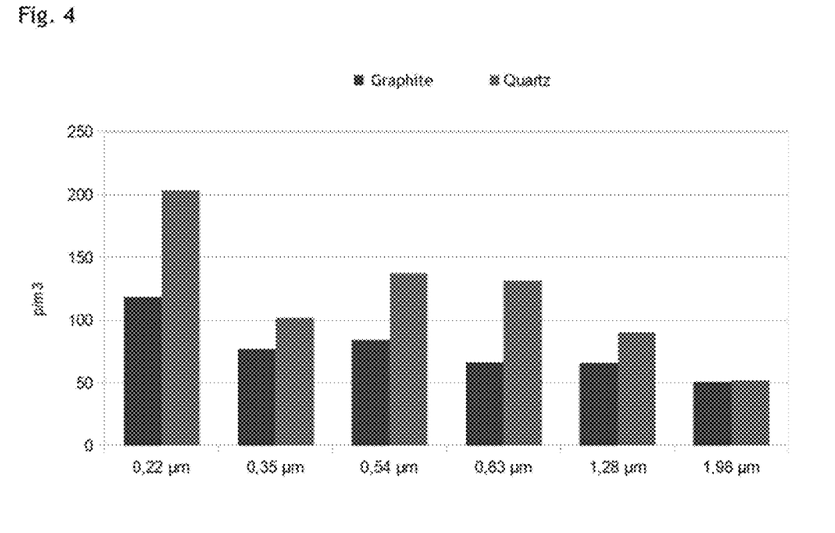
FIG. 4 is an example of a histogram of distribution of a number of particles according to their size.

FIG. 4 illustrates an example of a histogram of distribution of a number of particles according to their size. The measurements are carried out for a particle size range comprised between 0.1 and 2 μm, the size range being divided into 6 slices, and for graphite and silica particles. The distribution of graphite particles according to their size is shown in black, and the distribution of silica particles according to their size is shown in gray.

Alternatively or additionally, the signature of the sample measured in step E1 can depend on a shape of particles and on a number of particles. The particles of a given material are then discriminated against the particles of other materials present in the sample according to their shape, for example spheroid, lenticular, cubic, flat, disk, cylindrical, etc. The signature of the sample then comprises a distribution of a number of particles in the sample according to their shape.

Alternatively or additionally, the signature of the sample measured in step E1 can depend on a number of particles present in the sample and on a dimension of the dimensions of the particles in one direction (for example the direction of the largest dimension of the particle), two directions, or three orthogonal directions forming a three-dimensional space. The dimensions of a particle in three directions are the width, depth, and height of a particle.

The particle shape of the materials present in the sample can be determined based on the particle size(s) measured in the sample signature.

For example, a spherical or cubic shape of a particle can be identified when the three dimensions of the particle are substantially equal, that is to say when the particle has identical width, depth and height.

A flat or disk shape of a particle can be identified when the height of the particle is much less than the width and depth of the particle, the width and depth of the particle are otherwise substantially equal, or the width measuring no more than twice the depth of the particle, for example where the height of the particle is less than the width and the depth of the particle by at least a factor of two or at least a factor of ten.

A disk-cylindrical shape of a particle can be identified when the height of the particle is much greater than the width and depth of the particle, the width and depth of the particle being otherwise substantially equal, or the width measuring no more than twice the depth of the particle, for example when the height of the particle is greater than the width and the depth of the particle by at least a factor of two or at least a factor of ten.

Alternatively or additionally, the signature of the sample measured in step E1 can depend on a number of particles present in the sample and on a color, that is to say on a wavelength, of the particles. The wavelength of visible light is substantially comprised between 380 nm for violet and 780 nm for red.

Alternatively or additionally, the signature of the sample measured in step E1 can depend on a number of particles present in the sample and on diffraction properties of the particles, for example on a scattering intensity of the particles and/or a particle scattering angle. The scattering intensity reflects the level of diffraction of light in a given direction by a particle illuminated by incident light, and the scattering angle corresponds to the given direction in which the diffraction is measured.

The table below illustrates a non-limiting example of reference signatures measured for three different aerosols, the reference signatures being dependent on the dimensions and shapes of the particles, on a color of the particles, on a scattering intensity of the particles, and a particle scattering angle.

The measurement of a sample signature that depends on a number of particles present in the sample depending on size, shape, dimension, color, and/or diffraction properties of the particles present in the sample, allows to carry out the method for determining the amount of particles by means of a miniature, portable, autonomous apparatus attached to the operator, and by an operator having no particular qualification. The method is thus simplified, and its costs are reduced.

TABLE 1

| Signature of the reference sample | Particle sizes | | | | Particle diffraction properties | | Particle color |
|---|---|---|---|---|---|---|---|
| | X | Y | Z | Particle shapes | Scattering intensity (%) | Scattering angle (°) | Wavelength (nm) |
| Aerosol 1 | 1 | 1 | 1 | Spherical/cubic | 10 | 60 | 250 |
| Aerosol 2 | 1 | 5 | 6 | Flat/Disk | 10 | 20 | 600 |
| Aerosol 3 | 10 | 1 | 1 | Cylindrical | 10 | 180 | 250 |

The sizes of the sample particles in the table below are indicated as relative quantities, therefore without units. A sample particle has a given size that belongs to a bin 00-bin XX size class. The size of a particle is an aerodynamic size expressed in micrometers μm or in nanometers nm.

For example:

- the bin 01 class can correspond to an aerodynamic particle size of approximately 0.5 μm, with X=0.1 μm, Y=0.5 μm, and Z=0.5 μm, which corresponds to a flat or disk shape of the particles;
- the bin 01 class can correspond to an aerodynamic particle size of approximately 0.5 μm, with X=0.5 μm, Y=0.5 μm, and Z=0.5 μm, which corresponds to a spherical or cubic shape of the particles;
- the bin 02 class can correspond to an aerodynamic particle size of approximately 1 μm, with X=1 μm, Y=0.3 μm, and Z=0.2 μm, which corresponds to a cylindrical shape of the particles;
- the bin 02 class can correspond to an aerodynamic particle size of around 1 μm, with X=0.2 μm, Y=1 μm, and Z=1 μm, which corresponds to a flat or disk shape of the particles;
- etc.

In summary, the signature of the sample measured in step E1 can depend on a number of particles present in the sample and:

- on a size, and/or
- on a shape, and/or
- on a dimension, and/or
- on a color, and/or
- on diffraction properties, of the particles present in the sample.

Step E2: Identification of a Type of the Sample by Means of a Processing Unit 20

In a first embodiment, illustrated by way of non-limiting example in FIG. 2, the identification of the type of the sample during step E2 comprises a comparison of the signature of the sample with a plurality of reference signatures stored in the training database, each reference signature being associated with a reference sample type.

The training database is consulted each time the type of sample is identified.

To determine the type of the sample, the signature of the sample can be compared with one or more, in particular with each, of the reference signatures stored in the training database.

The classification model can in particular be a k-nearest neighbor type model. The k reference sample types whose reference signatures are closest to the signature of the sample measured, according to a determined distance, are taken into account to determine the type of the sample. The value of k can be comprised between 1 and N, where N corresponds to the number of samples in the classification database. For example, the value k can be comprised between 1 and 10, for example be equal to 5.

In a first exemplary embodiment, the type of the sample determined in step E2 corresponds to the reference sample type most represented among the k reference samples whose reference signatures are closest to the signature measured in step E1.

In a second exemplary embodiment, the type of the sample determined in step E2 corresponds to a combination of the types of the k reference samples whose reference signatures are closest to the signature measured in step E1, for example by allocating to each reference sample among the k closest reference samples an identical weight, or a variable weight according to the distance of their respective reference signatures from the signature of the sample measured in step E1.

The method can comprise a step of determining an unknown sample type when all the distances between the signatures of the reference samples and the signature measured in step E1 are greater than a certain threshold distance.

In a second embodiment, the classification model is a model of the neural network, support vector machine, stochastic gradient algorithm, or random forest algorithm type.

The method then comprises a prior step of training the classification model from the training database.

Once the training has been carried out, the determination of the type of the sample can be carried out for a sample signature measured in step E1 via the classification model developed during the training, without requiring consultation of the training database.

The classification model may comprise alpha-beta pruning.

In the first embodiment and in the second embodiment, the training database may comprise a plurality of reference signatures, each reference signature corresponding to a reference sample type, which can be produced during a specific operation.

Each reference signature can correspond to a reference histogram of distribution of a number of particles in the reference sample according to a particle size and/or a particle shape and/or a dimension of particles and/or particle color and/or particle diffraction properties.

Each signature of a reference sample can correspond to a vector, in a space of multidimensional features constructed thanks to the histogram of distribution in size and/or in shape and/or in dimension and/or in color and/or in properties of diffraction of the particles in the reference sample, each vector corresponding to a type of the reference sample.

Information regarding particle size, color, and/or diffraction properties may be independently produced for each bin 00-bin XX size class of particles in the sample, or may be produced only for some of the bin 00-bin XX size classes.

In summary, the signature of the sample measured in step E1 can comprise:

a histogram of distribution of a number of particles in the sample according to the size of the particles, and/or a histogram of distribution of a number of particles in the sample according to the shape of the particles, and/or a histogram of distribution of a number of particles in the sample according to the size of the particles, and/or a histogram of distribution of a number of particles in the sample according to the color of the particles, and/or a histogram of distribution of a number of particles in the sample according to the diffraction properties of the particles.

The signature of the sample measured in step E1 corresponds to an unlabeled vector, which is in the first embodiment compared to the vectors corresponding to the reference signatures of the reference samples of the training database.

A type of the reference sample can be defined by a nature of the reference sample and an activity of producing the reference sample. Indeed, the nature and/or the activity of producing a reference sample impacts its signature, in particular can impact the distribution in size and number of particles in the reference sample, and/or the amount of particles of a given material in the reference sample.

The nature of the reference sample may correspond to a material of the reference sample, such as brick, marble, concrete, quartz, the type of dust, etc., more particularly to a material that provided the dust contained in the sample.

The activity of producing the reference sample may correspond to an activity following which the reference sample was produced and/or to a tool corresponding to said activity, for example digging, sanding, cutting, demolition, etc., by means of a circular saw, sander, jackhammer, etc.

For example, a reference sample type may be a cement brick produced by sawing using a circular saw, the resulting dust comprising a given mixture fraction of concrete and marble.

The type of the sample identified in step E2 can be defined by a nature of the sample and an activity of producing the sample, the type of the sample being determined according to the types (nature and production activity) of the reference samples.

The more the training database contains a high number of reference sample types, the more the classification model will be able to recognize a large number of sample types reliably and efficiently.

The correspondence table associates a plurality of reference sample types with respective reference amounts of particles.

Each reference sample type is associated with at least one reference amount of particles of at least one given material. Each reference sample type can be associated with various amounts of reference particles of various given materials likely to have a risk to the health of an individual who breathes it. For example, each reference sample type can be associated with a respirable crystalline silica amount, a ballast dust amount, a chromium VI amount, a Lime amount, a diesel amount, a polluted earth dust amount, an amount of other hydraulic binders, etc.

The training database and the correspondence table can correspond to a single database. The table below illustrates a non-limiting example of a single database grouping together a training database associating a reference sample type with a reference signature, and a correspondence table associating each reference sample type with amounts of particles of several given materials.

TABLE 2

| Signature of the reference sample | Reference sample type | | Amount of particles in the reference sample | | |
|---|---|---|---|---|---|
| | Producing activity | Nature | Respirable Si amount | Chromium VI amount | Amount of particles X |
| S1 | Digging | A1 | a1 | b1 | c1 |
| S2 | Sanding | A2 | a2 | b2 | c2 |
| S3 | Cutting | A3 | a3 | b3 | c3 |
| S4 | Demolition | A4 | a4 | b4 | c4 |
| ... | ... | ... | ... | ... | ... |

An example of the method for constituting the training database and the correspondence table is described in the following paragraphs.

In order to constitute the training database, a plurality of reference samples having known reference types are taken on site. A reference signature corresponding to each reference sample is established, either directly on site, for example by means of an optical sensor adapted for carrying out a particle count, or subsequently, for example by means of a laboratory analysis.

In order to constitute the correspondence table, amounts of particles of various given materials corresponding to the type of the reference sample are analyzed, for example by means of a chemical analysis carried out in the laboratory, in order to associate with each reference sample type amounts of particles of the various given materials.

Step E3: Determination, by Means of the Processing Unit 20, of the Amount of Particles of the Given Material in the Sample Once the type of the sample has been identified, the processing unit 20 determines the amount of particles of a given material in the sample, using the amount of particles of the given material associated with each reference sample type.

The type of the sample can be periodically identified in step E2 at each calculation period. The amount of particles can be determined periodically in step E3 at each calculation period.

The calculation period can be equal to or greater than the measurement period. The identification of the type of sample and/or the determination of the amount of particles of the given material can therefore be carried out with each measurement carried out by the optical sensor 10, or at longer time intervals, so as to follow in real time and continuously, therefore regularly over time, the evolution of the amount of particles of the given material in the sample.

The calculation period can be equal to the measurement period. The calculation period can be comprised between 0.1 second and 10 hours, for example comprised between 1 second and 1 hour, for example comprised between 1 minute and 30 minutes, for example be equal to 15 minutes.

In particular, when the measurement period and the calculation period are both equal to 15 minutes, the signature of the sample is measured every 15 minutes, and the amount of particles of the given material is determined every 15 minutes, that is to say at each measurement of a signature of a sample.

When the calculation period is greater than the measurement period, the signature of the sample considered to determine the type of the sample may correspond to an average of the signatures of the samples produced at each measurement period occurring during the calculation period. Thus, the autonomy of the device is improved, and potential measurement errors are smoothed out.

E4: Determination of Exposure to Particles of the Given Material

The method may further comprise a step E4 of determining, by means of the processing unit 20 an exposure to particles of the given material from the amount of particles of the given material determined in step E2 and a time of exposure to said particles of the given material, as illustrated by way of non-limiting example in FIG. 3.

The exposure to the given type of material during a calculation period can be calculated by integrating the amount of particles of the given material determined in step E3 over a duration corresponding to the calculation period. The exposure to the given type of material during the exposure time determined in step E4 corresponds to the sum of the exposures during the calculation periods corresponding to this exposure time. Thus, the exposure calculated in step E4 takes into account the evolution over time of the amount of particles of the given material determined in step E3.

The exposure time can be greater than or equal to the calculation period. The exposure time can be defined according to the type and harmfulness of the given material, and/or according to the speed of adaptation of the desired protective measures. Thus, the shorter an exposure time, the more quickly and finely the determination of the exposure is carried out.

The exposure time can be comprised between 0.1 second and 10 hours, for example comprised between 1 second and 1 hour, for example comprised between 1 minute and 30 minutes, for example be equal to 15 minutes.

For example, if the exposure time is equal to 1 hour and the calculation period is equal to 15 minutes, the exposure is determined by summing, for each of the 4 calculation periods comprised in the exposure time, amounts of particles determined at each of these 4 calculation periods.

Alternatively or additionally, a predicted exposure to the type of particles of given material can be determined by multiplying the amount of particles of the given material determined during the calculation period, by a predicted exposure time corresponding to several calculation periods. Thus, a predicted exposure to the type of particles of the given material can be calculated in advance of the actual exposure.

E5: User Alert

The method may further comprise a step E5 of alerting a user when the exposure to the particles of the given material exceeds a predetermined exposure threshold, as illustrated by way of non-limiting example in FIG. 3.

The exposure threshold can be defined according to the given material, its potential impact on the health of the individual likely to breathe it, specific safety standards, etc.

Alternatively or additionally, the method may comprise a step E5' of alerting a user when the amount of particles determined in step E3 during a calculation period exceeds a predetermined amount threshold.

Thus, a temporary but significant excess of an amount of particles of the given material, regardless of when the excess occurs and the duration of the excess, is identified and the user is alerted, in order to be able to take adequate protective measures in real time and continuously.

Alternatively or additionally, the method may comprise a step E5" of alerting a user when the predicted exposure to the type of particles of given material exceeds a predetermined exposure threshold. Thus, protective measures can be taken before the operator is actually subjected to the exposure threshold.

E6: Alert Data Transmission

The method may further comprise a step E6 of transmitting alert data. The alert data may comprise the exposure determined in step E5, E5', or E5" and/or the amount of particles determined in step E3 for each calculation period and/or the signatures measured in step E1 for each calculation period.

The alert data can be transmitted when the exposure to the particles of the given material exceeds a predetermined exposure threshold, and/or when the amount of particles determined in step E3 during a calculation period exceeds a predetermined amount threshold.

Alert data can be transmitted to a remote server, over a wireless connection.

Figure 5:
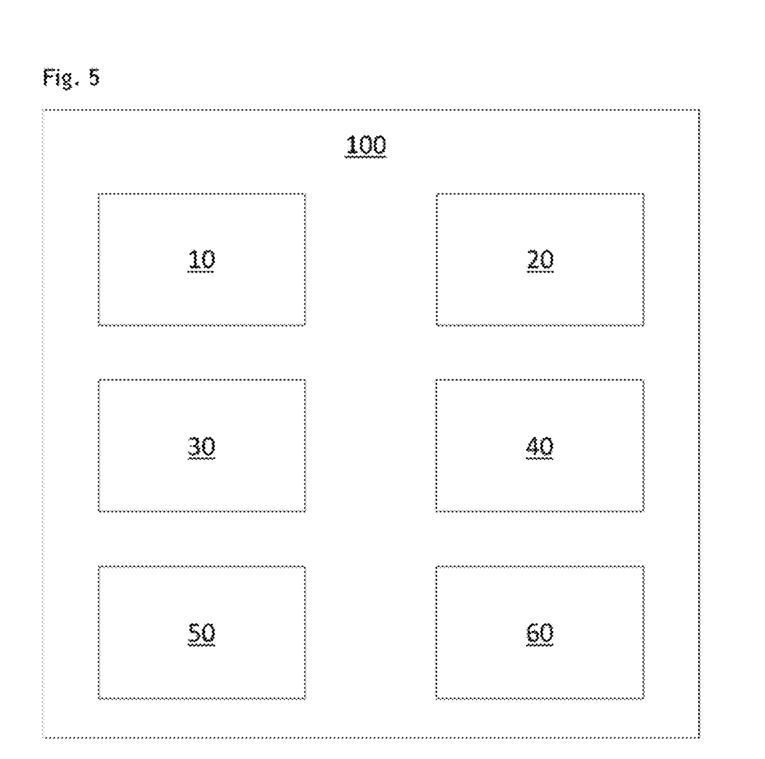
FIG. 5 is a diagram representing various elements of a system for determining an amount of particles according to an embodiment of the invention.

System for Determining, in Real Time and Continuously, the Amount of Particles of a Given Material in a Sample A system for determining, in real time and continuously, an amount of particles of a given material in a sample comprises, as illustrated by way of non-limiting example in FIG. 5:

an optical sensor 10 adapted for measuring a signature of a sample; and a processing unit 20 configured to:
  identify a type of the sample by means of a classification model trained on a training database comprising a plurality of reference signatures, each reference signature being associated with a reference sample type, and
  determine the amount of particles of the given material in the sample based on the identified sample type and a correspondence table associating, with each of a plurality of reference sample types, a reference amount of particles of the given material.

The system is adapted for implementing the method described above. The system can be a system for identifying and determining an amount of respirable crystalline silica particles emitted by various site operations. Alternatively or additionally, the system may be a system for identifying and determining a ballast dust amount, a Lime amount, a diesel amount, a polluted earth dust amount, an amount of other hydraulic binders, a Chromium VI amount, and/or an amount of other particles, emitted by various site operations.

By "processing unit 20", it will be understood that it can be any system allowing to carry out the desired processing, for example a single processing unit 20, or several processing units 20 which can be controlled by a parent unit. The processing unit 20 can comprise one or more microprocessor(s) adapted for processing the measurement data coming from the optical sensor 10 with a view to determining the amount of particles of the given material in the sample.

The classification model, the training database, and the correspondence table may correspond to those described above concerning the method for determining an amount of particles of the given material in a sample.

The processing unit 20 can further be configured to determine an exposure to particles of the given material from the amount of particles of the given material determined and a time of exposure to said particles of the given material.

The optical sensor 10 can be an optical particle counter configured to carry out a particle count. More particularly, the optical sensor 10 can be configured to generate a histogram of distribution of a number of particles in the sample according to the size of the particles. A concentration of the particles of the given material in the sample, expressed for example in ppm or $\mu g/m^3$, can be deduced from the distribution histogram measured by the optical sensor 10. For example, the concentration can be determined by considering that all the particles are spherical, and considering known material density values.

The optical sensor 10 can be adapted to accurately measure the signature of the sample, more particularly the distribution of the number of particles according to their size, in a range of particle sizes which can correspond to particles of size less than 40 µm, for example comprised between 0.1 and 10 µm.

The optical sensor 10 can be a micro-sensor. The optical sensor 10 can be an optical sensor 10 of the nephelometer and laser diffraction type. Such optical particle counters are robust, precise and inexpensive, and allow reliable measurements to be made on a wide variety of sample types, whether they come from natural rocks (granite, sand, etc.) or transformed materials (concrete, cement, mortar).

The optical sensor 10 can be portable. By portable, it will be understood that the optical sensor 10 is not fixed permanently on the ground, can be transported, the optical sensor 10 having a moderate weight and space requirement. In particular, the optical sensor 10 can be taken on board by a user such as an individual working on a construction site, such as an operator or an inspector, without representing a substantial inconvenience for the individual during his work.

The measurements taken by the optical sensor 10 can be transmitted to the processing unit 20 which can be a remote server. Alternatively, the processing unit 20 and the optical sensor 10 can be integrated into a portable module. Exposure can then be assessed on a personal scale.

Alternatively, the optical sensor 10 can be stationary, that is to say be posted at a given location on the site. The processing unit 20 can be a remote server to which the measurement data is sent to be processed. The system then comprises means for transmitting the measurement data to the processing unit 20. The exposure can then be evaluated on the scale of the construction site, the optical sensor 10 being implemented in a stationary manner.

The system may further comprise storage means 30 configured to store the measurements performed by the optical sensor 10. The storage means 30 may, alternatively or additionally, be configured to store the correspondence table and/or the training database. The storage means 30 can also be adapted to store the alert data, for a determined storage period of time.

The storage means 30 can comprise a dedicated electronic card, such as an SD storage card. A dedicated electronic card consumes little energy, which preserves the autonomy of the system.

The system may further comprise an alert unit 40 adapted for alerting a user when the exposure to the particles of the given material exceeds a predetermined exposure threshold. The alert unit 40 may correspond to the processing unit 20.

The user alerted by the alert unit may correspond to the user carrying the system, for example an operator or an inspector working on a construction site, or another user, for example a manager of the operator or a construction site control center.

The system may further comprise a transmission unit 50 adapted for transmitting alert data. The transmission unit 50 can be configured to carry out transmission over a wireless connection.

The transmission unit 50 can in particular comprise an emitter module allowing transmission by means of LPWAN technologies, in order to limit the energy consumed by the transmission and thus to increase the autonomy of the system.

The system may further comprise a battery 60 adapted for supplying energy to the processing unit 20 and/or the alert unit 40 and/or the transmission unit 50.

The battery 60 may comprise one or more non-rechargeable batteries mounted in series, or be rechargeable by a charger, the nature of the battery being able to be selected according to the autonomy desired for the system.

The system may further comprise a housing 100. The optical sensor 10 and the processing unit 20 are integrated into the housing 100. If necessary, the storage means 30, the alert unit 40, the transmission unit 50 and/or the battery 60 can also be integrated into the housing 100.

The housing 100 can be made of waterproof material, in order to protect the electronics of the system from common external disturbances on construction sites, such as water and dust. The reliability of the measurements is increased and the lifetime of the components of the device is thereby improved.

The housing 100 can be portable, in order to be able to be transported by a user without disturbing him, the housing 100 having a moderate weight and size.

Other embodiments can be considered and a person skilled in the art can easily modify the embodiments or exemplary embodiments set out above or consider others while remaining within the scope of the invention.

The invention claimed is:

1. A method for determining an amount of particles of a given material in a sample, wherein the determination is carried out in real time, the determination being carried out simultaneously with an exposure of an individual to the particles of the given material, and continuously, the determination being carried out periodically over time, in which the sample is an air sample likely to comprise airborne particles, in which the method comprises steps of:
   E1: optically measuring a signature of the sample;
   E2: identifying, by a processor unit, a type of the sample based on the measurement of the signature of the sample, a classification model of a k-nearest neighbor type, and a training database comprising a plurality of reference signatures, each reference signature being associated with a reference sample type, wherein the identification of the type of the sample comprises a comparison of the signature of the sample with the plurality of reference signatures stored in the training database; and
   E3: determining, by the processor unit, an amount of the particles of the given material in the sample based on the identified sample type and a correspondence table associating, with each of a plurality of reference sample types, a reference amount of particles of the given material.

2. The method for determining an amount of particles according to claim 1, wherein the given material is at least one of respirable crystalline silica, ballast dust, lime, diesel particles, polluted earth dust, other hydraulic binders, Chromium VI particles, and/or other particles emitted by various site operations.

3. The method for determining an amount of particles according to claim 1, wherein the signature of the sample measured in step E1 depends on a size and a number of particles present in the sample, and/or depends on a shape and a number of particles present in the sample.

4. The method for determining an amount of particles according to claim 3, wherein the signature of the sample measured in step E1 comprises a histogram of distribution of a number of particles in the sample according to the size of the particles, and/or comprises a histogram of distribution of a number of particles in the sample according to the shape of the particles.

5. The method for determining an amount of particles according to claim 1, wherein the signature of the sample measured in step E1 depends on a number of particles present in the sample, and on a size of the particles present in the sample and/or a color of the particles present in the sample and/or diffraction properties of the particles present in the sample, and wherein the signature of the sample measured in step E1 comprises a histogram of distribution of a number of particles in the sample according to the size of the particles and/or according to the color of the particles and/or according to the diffraction properties of the particles.

6. The method for determining an amount of particles according to claim 1, wherein the sample type identified in step E2 is defined by a nature of the sample, corresponding to a material of the reference sample, and an activity of producing the sample, corresponding to an activity following which the reference sample was produced and/or to a tool corresponding to said activity.

7. The method for determining an amount of particles according to claim 1, wherein the signature of the sample is measured periodically in step E1 at each measurement period, the type of the sample is periodically identified in step E2 at each calculation period and the amount of particles is determined periodically in step E3 at each calculation period, wherein the calculation period is equal to or greater than the measurement period, wherein the measurement period and the calculation period are comprised between 1 second and 1 hour.

8. The method for determining an amount of particles according to claim 1, further comprising a step E4 of determining, by the processor unit an exposure to particles of the given material from the amount of particles of the given material determined in step E3 and a time of exposure to said particles of the given material.

9. The method for determining an amount of particles according to claim 8, further comprising a step E5 of alerting a user when the exposure to the particles of the given material exceeds a predetermined exposure threshold.

10. A system for determining an amount of particles of a given material in a sample, the determination system being configured to carry out a determination in real time, the determination being carried out simultaneously with an exposure of an individual to the particles of the given material, and continuously, the determination being carried out periodically over time, in which the sample is an air sample likely to comprise airborne particles, and in which the system comprises:
   an optical sensor configured to measure a signature of the sample; and
   a processor unit configured to:
      identify a type of the sample based on the measurement of the signature of the sample, a classification model of a k-nearest neighbor type, and a training database comprising a plurality of reference signatures, each reference signature being associated with a reference sample type, wherein the identification of the type of the sample comprises a comparison of the signature of the sample with the plurality of reference signatures stored in the training database, and
      determine an amount of the particles of the given material in the sample based on the identified sample type and a correspondence table associating, with each of a plurality of reference sample types, a reference amount of particles of the given material.

11. The system for identifying and determining an amount of particles according to claim 10, wherein the optical sensor is configured to carry out a particle count.

12. The system for identifying and determining an amount of particles according to claim 10, wherein the optical sensor is portable.

13. The system for identifying and determining an amount of particles according to claim 10, further comprising a storage configured to store the measurements made by the optical sensor and/or the training database and/or the correspondence table.

14. A method for determining an amount of particles of a given material in a sample, wherein the determination is carried out in real time, the determination being carried out simultaneously with an exposure of an individual to the particles of the given material, and continuously, the determination being carried out periodically over time, in which the sample is an air sample likely to comprise airborne particles, in which the method comprises steps of:
   E1: optically measuring a signature of the sample;
   E2: identifying, by a processor unit, a type of the sample based on the measurement of the signature of the sample and a classification model of a neural network, support vector machine, stochastic gradient algorithm, or random forest algorithm type, the classification model being trained on a training database comprising a plurality of reference signatures, each reference signature being associated with a reference sample type; and
   E3: determining, by the processor unit, an amount of the particles of the given material in the sample based on the identified type of the sample and a correspondence table associating, with each of a plurality of reference sample types, a reference amount of particles of the given material.

15. A method for determining an amount of particles of a given material in a sample, wherein the determination is carried out in real time, the determination being carried out simultaneously with an exposure of an individual to the particles of the given material, and continuously, the determination being carried out periodically over time, in which the sample is an air sample likely to comprise airborne particles, in which the method comprises steps of:
   E1: optically measuring a signature of the sample, the signature of the sample depending on a size and a number of particles present in the sample and/or on a shape and a number of particles present in the sample;
   E2: identifying, by a processor unit, a type of the sample based on the measurement of the signature of the sample and a classification model trained on a training database comprising a plurality of reference signatures, each reference signature being associated with a reference sample type; and
   E3: determining, by the processor unit, an amount of the particles of the given material in the sample based on the identified type of the sample and a correspondence table associating, with each of a plurality of reference sample types, a reference amount of particles of the given material.

* * * * *